United States Patent
Howarth (10) Patent No.: US 11,933,634 B2
(45) Date of Patent: Mar. 19, 2024

(54) COMPRESSOR VARIABLE ANGLE MEASUREMENT SYSTEM

(71) Applicant: ROLLS-ROYCE plc, London (GB)

(72) Inventor: Nicholas Howarth, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/818,818

(22) Filed: Aug. 10, 2022

(65) Prior Publication Data

US 2023/0130991 A1    Apr. 27, 2023

(30) Foreign Application Priority Data

Aug. 27, 2021   (GB) ...................................... 2112281

(51) Int. Cl.
| | | |
|---|---|---|
| G01C 9/00 | (2006.01) | |
| F04D 27/02 | (2006.01) | |
| G01B 7/30 | (2006.01) | |

(52) U.S. Cl.
CPC ......... G01C 9/005 (2013.01); F04D 27/0246 (2013.01); G01B 7/30 (2013.01); F05D 2220/32 (2013.01); F05D 2230/60 (2013.01); F05D 2270/80 (2013.01)

(58) Field of Classification Search
CPC ... G01C 9/005; F04D 27/0246; F04D 27/001; F04D 29/563; G01B 7/30; G01B 5/24; F01D 21/003; F01D 17/162; F05D 2220/32; F05D 2230/60; F05D 2270/80; F05D 2230/64; B60R 2011/0059; B60R 2011/0071
See application file for complete search history.

(56) References Cited

U.S. PATENT DOCUMENTS

| | | | |
|---|---|---|---|
| 1,954,998 A | 4/1934 | Hoffmann | |
| 2008/0273965 A1* | 11/2008 | Rajamani | F01D 21/003 60/39.24 |
| 2016/0356172 A1* | 12/2016 | DiVincenzo | F01D 21/003 |
| 2018/0058246 A1* | 3/2018 | Keenan | F01D 9/042 |

FOREIGN PATENT DOCUMENTS

| | | |
|---|---|---|
| EP | 2336498 A1 | 6/2011 |
| WO | 2014051663 A1 | 4/2014 |
| WO | 2018093277 A1 | 5/2018 |
| WO | 2019210997 A1 | 11/2019 |

OTHER PUBLICATIONS

Great Britain search report dated Jan. 26, 2022, issued in GB Patent Application No. GB2112281.7.
European Search Report dated Jan. 19, 2023, issued in EP Patent Application No. 22188673.

* cited by examiner

Primary Examiner — Brian Christopher Delrue
(74) Attorney, Agent, or Firm — Barnes & Thornburg LLP (57) ABSTRACT

A compressor variable angle measurement system for guiding the positioning variable vanes supported on a penny of a compressor of a gas turbine engine. The system comprising a gauge assembly that is connectable to a computing device. the gauge assembly comprises a base plate and a clamp arm. The gauge assembly is configured to removably grip a variable vane between three vane contact portions of the baseplate and the vane contact portion of the clamp arm and on the leading edge vane engaging portion and the trailing edge vane engaging portion of the base plate, the stagger angle of the variable vane with respect to the radial setting pin being determined by the computing device from measurements made by an inertial measurement unit.

16 Claims, 10 Drawing Sheets

COMPRESSOR VARIABLE ANGLE MEASUREMENT SYSTEM

CROSS-REFERENCE TO RELATED APPLCATIONS

This application is based upon and claims the benefit of priority from British Patent Application GB 2112281.7, filed on Aug. 27, 2021, the entire contents of which are hereby incorporated by reference.

BACKGROUND

Technical Field

The present disclosure concerns a compressor variable angle measurement system, more particularly a system for guiding the accurate positioning of variable vanes of a compressor of a gas turbine engine.

Description of Related Art

Gas turbine engines are typically employed to power aircraft. Typically a gas turbine engine will comprise a fan driven by an engine core. The engine core is generally made up of one or more turbines (e.g. high pressure and intermediate pressure turbines) which drive respective compressors via coaxial shafts.

The compressors compress air that flows into the engine core and is directed into combustion equipment where it is mixed with fuel and the mixture combusted, the resulting hot combustion products expanding through and thereby driving the turbines.

Compressors, more particularly axial compressors, typically comprise multiple stages, each stage consisting of a row of rotating blades called rotor blades that are connected to a central shaft and a row of stationary or fixed blades called stators. As air passes through each compressor stage the air pressure and temperature increases. The aerodynamic performance and handling characteristics of the compressor are largely determined by the geometries of the rotor blades and the stators in the compressor stages.

Stators straighten or align the airflow, i.e. the swirl coming off the blades, ready for the next set of rotating blades. They are also known as stator vanes or guide vanes.

While stator vanes are intended to be stationary in use, it can be advantageous to be able to adjust their positioning to optimise their function. Such adjustable stator vanes are known as variable stator vanes or simply variable vanes. Compressors that include variable vanes are known as variable geometry compressors.

Variable vanes can typically pivot about axes such as to vary the angle of the vane aerofoil to optimize compressor operability and/or efficiency over the compressor speed range. These variable vanes may include variable inlet guide vanes (IGV), which are located directly upstream of the first compressor stage, or variable vanes, which form part of one or more of the subsequent downstream stages in a multistage compressor. As the engine power/rotational speed of the compressor vary the vanes are rotated to optimise compressor performance for efficiency and aerodynamic stability. More specifically, variable vanes enable optimized compressor efficiency and/or operability by providing a close-coupled direction of the gas flow into the immediately downstream compressor rotor, and/or may introduce swirl into the compressor rotor to improve low speed operability of the compressor, and thus the engine, as well as to increase the flow capacity at high speeds.

Each variable vane typically has an aerofoil cross-section with an integral spindle to allow rotation or variation of stagger. It is mounted in bushes in a casing or inner shroud ring and has a lever fitted to its outer end. The levers are connected to a unison ring via spherical bearings so that when the unison ring is rotated the vanes all re-stagger together. The casing or inner shroud ring is known as a penny.

When building a gas turbine engine the variable vanes must be set at the intended stagger angle(s). This however is difficult in practice due to multiple sources of mechanical tolerance being at play, especially to achieve the desirably high levels of consistency and accuracy that are needed to optimise compressor and engine performance.

To allow for such variations in setting stagger angles it is necessary to introduce margins into the design of the engine that cover worst case scenarios of noncompliance with aerodynamic design intent, i.e. "malschedule". These allowances include compromises to compressor aerodynamics and engine acceleration/deceleration times. Compromises to compressor efficiency adversely affect fuel efficiency. And compromises to acceleration adversely affect landing glide scope capture ability.

It is known to use an inclinometer to set the stagger angle of a compressor variable vane. An inclinometer or clinometer is an instrument used for measuring angles of slope (or tilt), elevation, or depression of an object with respect to gravity's direction. Hand-held clinometers are used for a variety of surveying and measurement tasks.

United States patent application US 2018/058246 A1 discloses a variable vane mechanism for adjusting the angle of stator vanes in a gas turbine engine. The mechanism includes a circumferentially extending unison ring that is driven circumferentially around a casing by an actuator. The unison ring is connected to the stator vanes via levers such that the angle of the vanes changes with circumferential movement of the unison ring. The unison ring and the casing are each provided with at least one rigging hole in order to set the initial angle of the vanes. At least one of the unison ring and the casing are each provided with at least two rigging holes, so that the initial angle of the vanes can be adjusted by selecting different combinations of rigging holes. This may allow accumulations in tolerances to be compensated for and/or may allow the engine to be tested at different initial vane angles. However it does not provide the aerodynamic stagger angles necessary to understand the aerodynamic performance of a compressor.

Some known inclinometers have rotating arms with electrical contactors or mechanical contact points that bear against the surface of an aerofoil and various angles are measured by rotary encoders and/or mechanical protractors. However experience has demonstrated that such inclinometers are operator sensitive and prone to significant operator to operator discrepancies.

Other known inclinometers include optical sensors but they are designed to measure exterior engine features, e.g. actuator arms, rather than internal engine components such as aerofoils. And they are generally incapable of providing the richness of data or accuracy needed to usefully inform the effective design of inclinometers and/or the effective positioning of internal engine components such as aerofoils using inclinometers.

It is therefore desirable to provide an approved compressor variable angle measurement system or at least a system that provides a useful alternative to known compressor vane installation systems and methods.

SUMMARY

The present disclosure provides a compressor variable angle measurement system, a gas turbine engine, and a method as set out in the appended claims.

In a first aspect the present disclosure provides a compressor variable angle measurement system for guiding the positioning variable vanes supported on a penny of a compressor of a gas turbine engine, the compressor variable angle measurement system comprising a gauge assembly that is connectable to a computing device; the gauge assembly comprises: a baseplate that has a first section and a second section, the first section having a leading edge vane engaging portion, a trailing edge vane engaging portion, a plurality of vane contact portions, and a radial setting pin, the second section having an inertial measurement unit, the radial setting pin being configured to contact the penny that supports the vane; a clamp arm that is pivotally attached to the baseplate and has a first section that has a vane contact portion, the first section of the clamp arm being spring urged towards the first section of the baseplate; the gauge assembly being configured to removably grip a variable vane between the three vane contact portions of the baseplate and the vane contact portion of the clamp arm and on the leading edge vane engaging portion and the trailing edge vane engaging portion of the base plate, the stagger angle of the variable vane with respect to the radial setting pin being determined by the computing device from measurements made by the inertial measurement unit.

The compressor variable angle measurement system generates accurate (for example. +/−0.2 degrees) aerodynamic stagger angles for compressor blading.

The compressor variable angle measurement system facilitates data of sufficient fidelity to allow engine design to be modified to realise fuel burn and noise benefits.

Such a system is useful for reducing malschedule uncertainty.

In some embodiments the leading edge vane engaging portion and the trailing edge vane engaging portion are located adjacent where the baseplate is pivotally attached to the clamp arm.

In some embodiments the leading edge vane engaging portion and the trailing edge vane engaging portion are located adjacent pivot portions formed in the clamp arm about which the baseplate is pivotally attached to the clamp arm.

In some embodiments the leading edge vane engaging portion and the trailing edge vane engaging portion are located adjacent pivot supports formed in the baseplate about which the clamp arm is pivotally attached to the baseplate.

In some embodiments the vane contact portions of the baseplate have vane contact cushions. These assist to prevent or at least minimise any scratching or other damage to the surface of the vane.

In some embodiments the vane contact cushions are formed of nylon. Nylon has a sufficiently low coefficient of friction to enable the vane contact cushions to slide on the surface of a variable vane thereby avoiding or at least minimising any scratching or other damage to the surface of the vane.

In some embodiments the vane contact portions of the clamp arm have vane contact cushions. These assist to prevent or at least minimise any scratching or other damage to the surface of the vane.

In some embodiments the vane contact cushions are formed of nylon. Nylon has a sufficiently low coefficient of friction to enable the vane contact cushion to slide on the surface of a variable vane thereby avoiding or at least minimising any scratching or other damage to the surface of the vane.

In some embodiments the baseplate and/or the clamp arm include an aperture. The provision of such apertures assists the user to see whilst using the equipment better. It also enables the gauge assembly to be lighter in weight.

In some embodiments the radial setting pin is elongate and/or has a substantially circular cross-section.

In some embodiments the compressor variable angle measurement system comprises a set of guide assemblies configured to measure the positioning of different variable vanes in the gas turbine engine. This reflects that the size of variable vanes typically differs within a gas turbine engine and that the size of variable vanes typically differs between engine models. For a given engine model a set of guide assemblies may, for example, consist of three gauge assemblies i.e. a large, an intermediate and a small gauge assembly.

In a second aspect the present disclosure provides a gas turbine engine that has variable vanes positioned by guidance obtained from the compressor variable angle measurement system of the first aspect. The judicious positioning of variable vanes in a gas turbine engine compressor can improve compressor aerodynamics and therefore compressor efficiency and engine fuel efficiency.

In a third aspect the present disclosure provides a method of positioning variable vanes in a compressor of a gas turbine engine, the method comprising the steps of: (a) removably gripping a variable vane of the compressor within a gauge assembly of the compressor variable angle measurement system of the first aspect; (b) bringing the radial setting pin into contact with the penny that supports the vane; (c) measuring the position of the variable vane with respect to the radial setting pin; and (c) adjusting the position of the variable vane to a desired position informed by data obtained from the compressor variable angle measurement system.

In some embodiments in step (a) the variable vane is located on the leading edge vane engaging portion and trailing edge vane engaging portion of the baseplate and gripped between three vane contact portions of the baseplate and the vane contact portion of the clamp arm.

The term "compressor variable vane" as used herein means a stator vane of a compressor of a gas turbine engine that is moveable in angle to set compressor aerodynamics performance at different operating points.

The term "stagger angle" as used herein means the aerodynamic stagger angle of the aerofoil.

The term "baseplate angle" as used herein means the angle of the baseplate of the gauge (specifically the underside which is datum). This angle has a fixed relationship with stagger angle and differs from one vane design to another/engine type and stage.

The term "cottage roof angle" as used herein means the angle of the mechanical feature on the end of the vane spindle that is used to apply torque to a variable vane to rotate it around the spindle axis. This angle has a fixed relationship with stagger angle and differs from one vane design to another/engine type and stage.

The term "aero stagger angle" as used herein is the sum of the baseplate angle, the cottage roof angle and another offset angle.

The term "vane average baseplate angle" as used herein means the average of the whole set of baseplate angle measurements for a given stage/row of vanes.

The term "aero stagger delta values" as used herein means the delta stagger angle relative to design intent.

The term "vane average aero stagger angle" as used herein means as vane average baseplate angle but aero stagger angle. It is calculated by summing the vane average baseplate angle the appropriate delta angle between baseplate and aero stagger angle from the config. file, determined at initialisation.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying drawings. Further aspects and embodiments will be apparent to those skilled in the art.

The present disclosure concerns a compressor variable angle measurement system, more particularly a system for guiding the accurate positioning of variable vanes of a compressor of a gas turbine engine.

High pressure ratio axial compressors require variable geometry (angle) vanes in the front stages to unload the blades aerodynamically at low power to avoid compressor stall/surge. The vanes open gradually as the power and speed of the compressor rise and critically affect both surge margin and efficiency of the machine.

The angle of the vanes is important to understanding and controlling the behaviours of the compressor and engine. The vanes are typically controlled by circumferential unison rings rotated by hydraulic rams. The circumferential setting of the rings is currently achieved by rigging pins which pass radially through the rings to locate in the compressor case. However, there are geometrical tolerance stack ups to be accounted between ring location and where the aerodynamic surfaces are pointing and these are open to critique.

In a first aspect the present disclosure provides compressor variable angle measurement system for guiding the positioning variable vanes within a compressor of a gas turbine engine.

Figure 1:
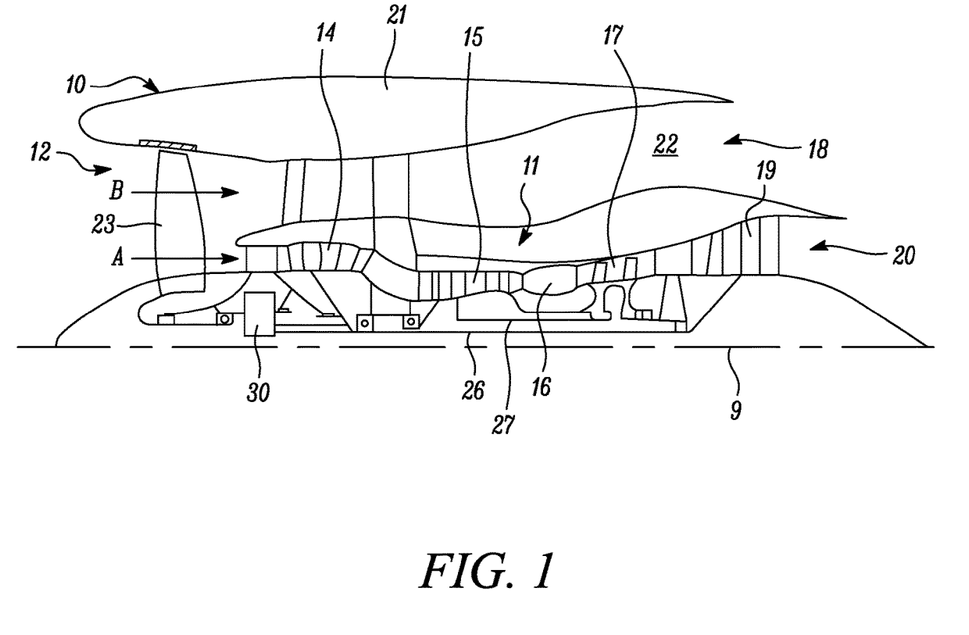
FIG. 1 is a schematic sectional side view of a gas turbine engine, more particularly a geared turbofan aircraft engine.

FIG. 1 illustrates a gas turbine engine 10 having a principal rotational axis 9. The engine 10 comprises an air intake 12 which receives air and a propulsive fan 23 generates two airflows: a core airflow A and a bypass airflow B. Air intake airflow comprises the sum total of the air flowing into the operational upstream end of the engine 10, with the sum total of the core airflow A and the bypass airflow B substantially equal to the intake airflow.

The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
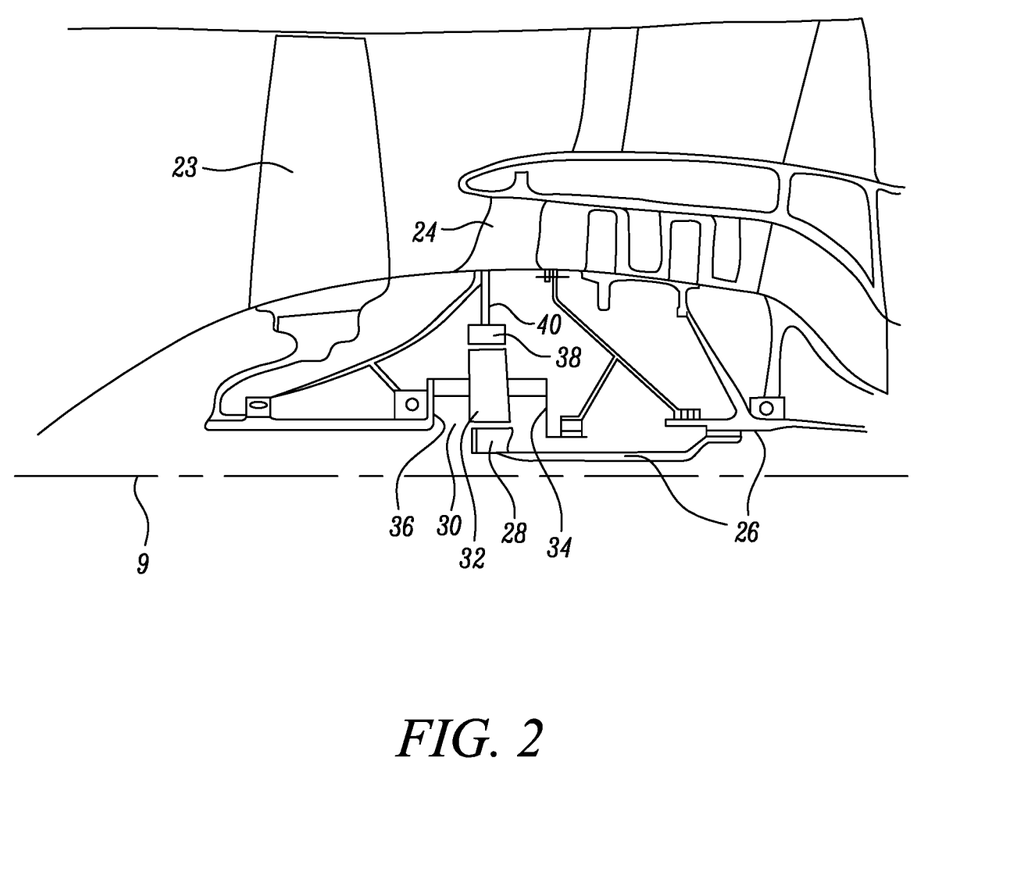
FIG. 2 is a schematic close up sectional side view of an upstream portion of the gas turbine engine shown in FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
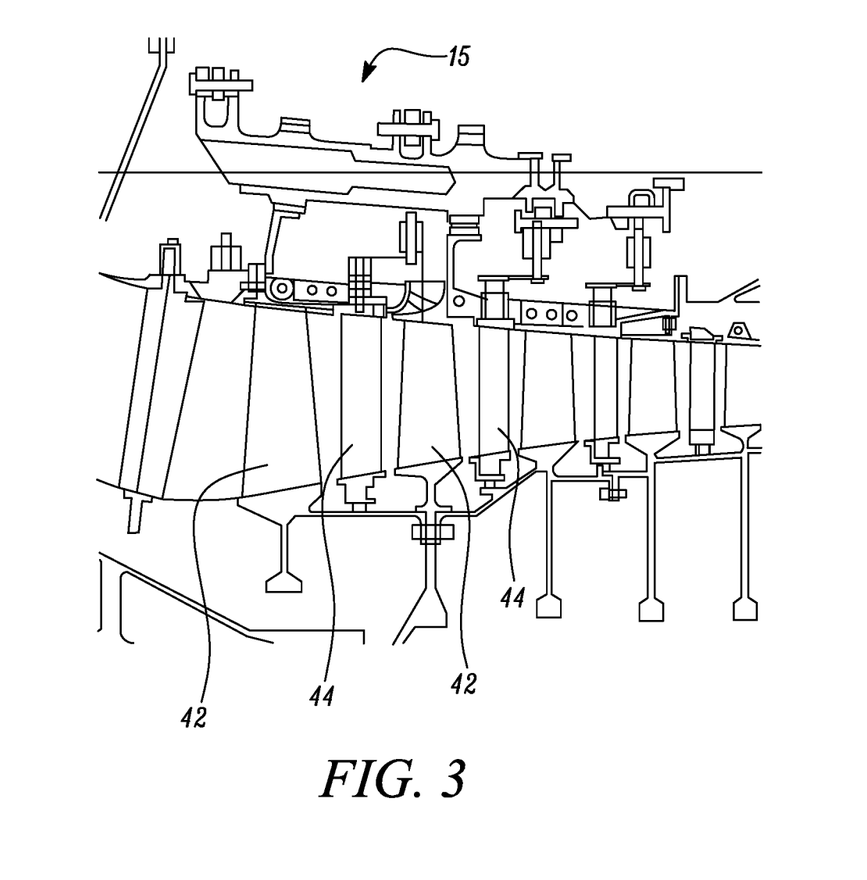
FIG. 3 is a sectional side view of a high pressure compressor of a gas turbine engine

The present disclosure concerns a system for accurately positioning variable vanes of a compressor of a gas turbine engine. Such variable vanes are typically stators. FIG. 3 is a sectional side view of the high pressure compressor 15 of the gas turbine engine 10 depicted in FIGS. 1 and 2. The drawing identifies rotor blades 42 and stators blades 44 within the low pressure compressor 14. The stator blades are variable stator vanes (VSV). The present disclosure concerns the accurate positioning of such vanes.

Figure 4:
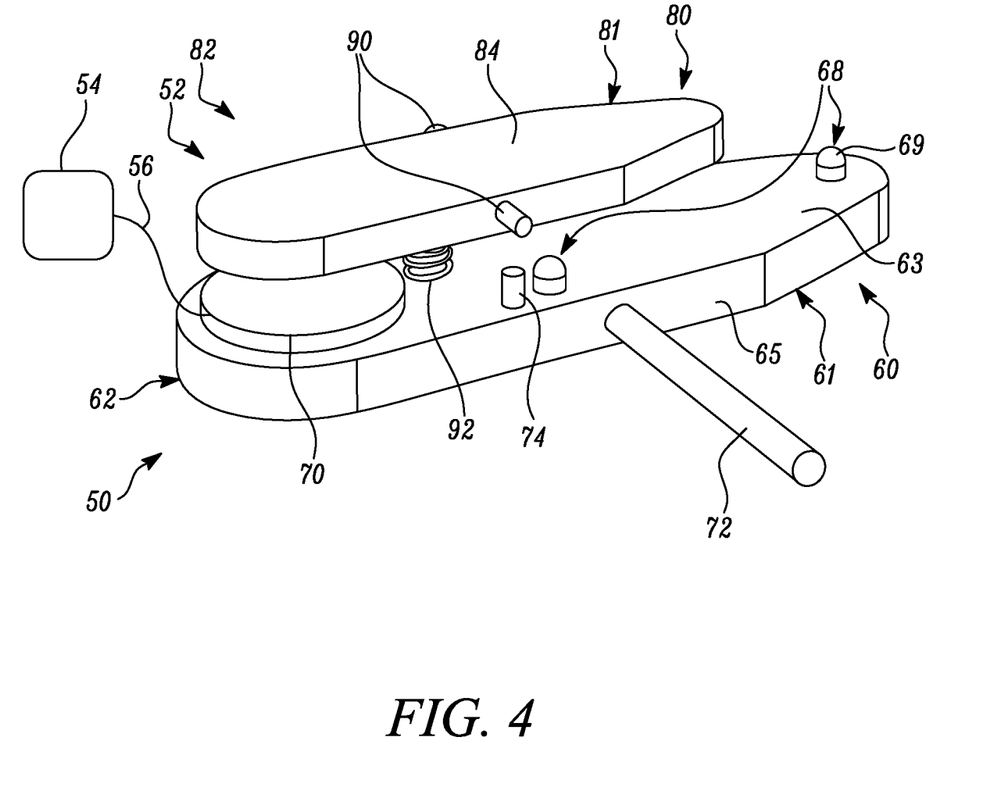
FIG. 4 is a schematic side perspective view of a compressor variable angle measurement system of the present disclosure.

In a first aspect the present disclosure provides a compressor variable angle measurement system. Such a system is depicted in FIG. 4. The compressor variable angle measurement system 50 comprises a gauge assembly 52 and a computing device 54. The gauge assembly is connectable to the computing device but the manner of that connection is described in more detail below.

Figure 5:
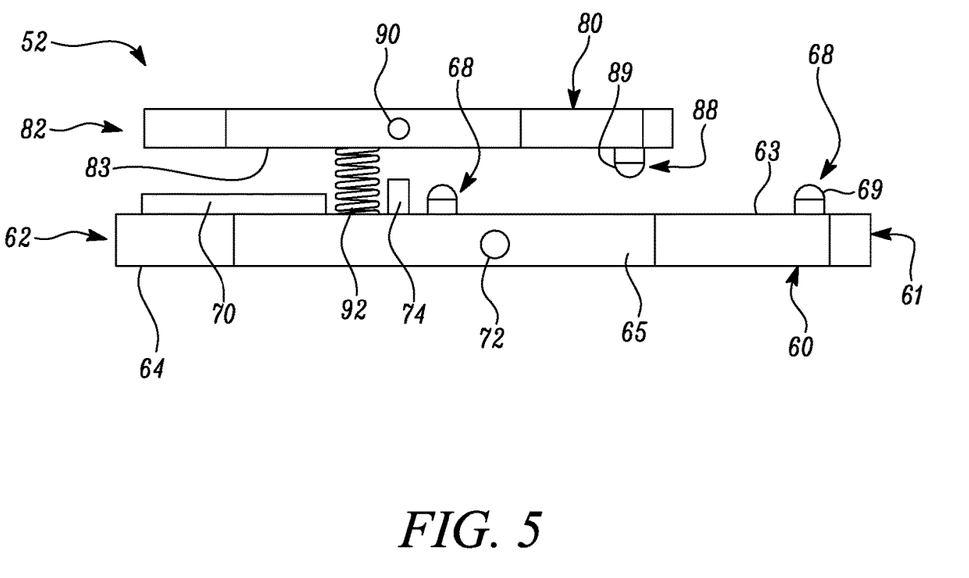
FIG. 5 is a schematic side view of the compressor variable angle measurement system of the present disclosure shown in FIG. 4.
Figure 6:
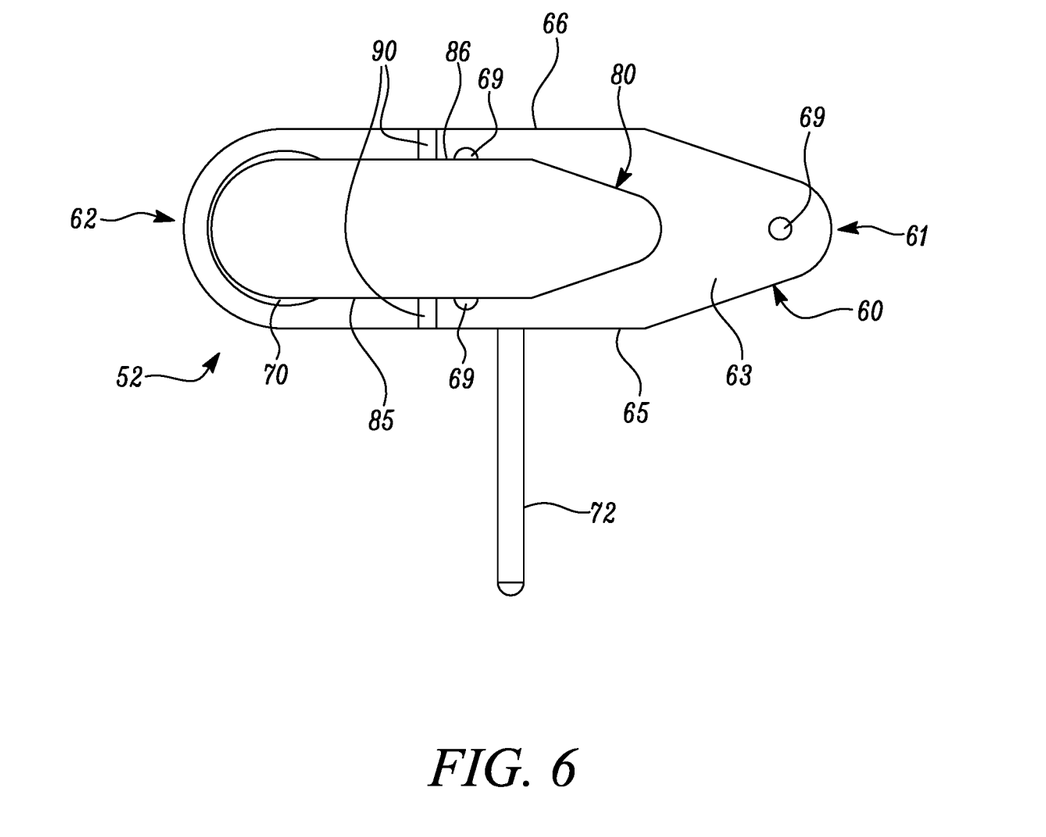
FIG. 6 is a schematic plan view of the compressor variable angle measurement system of the present disclosure shown in FIGS. 4 and 5.
Figure 7:
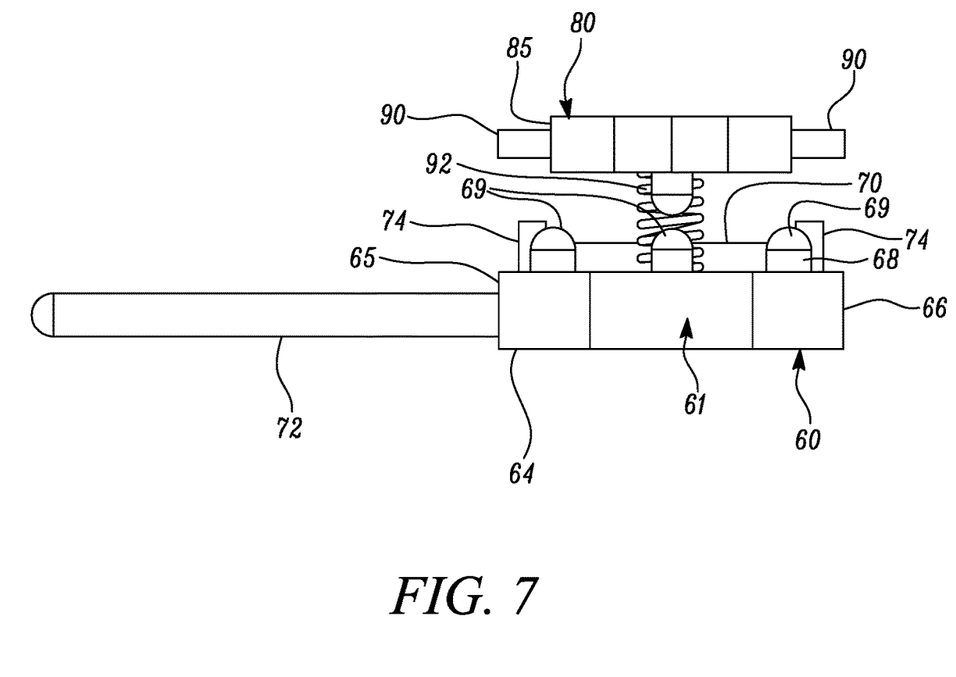
FIG. 7 is a schematic end view of the compressor variable angle measurement system of the present disclosure shown in FIGS. 4, 5 and 6.

Various views of the gauge assembly 50 shown in FIG. 4 are provided in FIGS. 5, 6 and 7. FIG. 5 is a side view, FIG. 6 is a plan view and FIG. 7 is an end view.

The gauge assembly 52 of the compressor variable angle measurement system 50 has a baseplate 60 that has a first section 61, a second section 62, a first surface 63, a second surface 64, a first side 65 and a second side 66. The baseplate can be composed of any substance suitable for the purpose. In certain embodiments the baseplate is composed or a metal or metal alloy, for example, a rigid plastic material, or a composite material, e.g. carbon fibre.

The baseplate 60 has multiple vane contact portions 68, i.e. portions that extend from the first surface 63 of the baseplate 60 that are configured and positioned to contact a variable vane to be measured in the compressor variable angle measurement system whilst minimising any scratching or other damage to the variable vane. In some embodiments, as shown in FIGS. 4 to 7, each vane contact portion includes a vane contact cushion 69, which e.g. may be hemispherical in shape and which e.g. may be composed of a scratch-resistant plastic/polymer material.

The number of vane contact portions 68 that are provided on the baseplate can vary as required. In some embodiments three vane contact portions 68 are provided on the baseplate as this usefully balances the provision of effective support for the variable vane with the desire to minimise the possibility of the variable vane being scratched or otherwise damaged.

The baseplate 60 of the gauge assembly 52 includes an inertial measurement unit (IMU) 70. IMUs are electronic sensor devices that function as accelerometers, gyroscopes and/or magnetometer. The purpose of IMU will be explained below. The IMU can take various forms. Suitable IMUs are commercially available, one such IMU being the Variense™ VMU931 inertial measurement unit, which is a round IMU with a diameter of 31 mm, that can accommodate up to 3-axis accelerometers, 3-axis gyros, 3-axis magnetic, temperature sensors in a robust aluminium housing. It is shock resistant, splashproof and dustproof.

The baseplate 60 of the gauge assembly 52 also includes a radial setting pin 72 that extends from the first side 65 of the gauge assembly. The radial setting pin is used to set the gauge assembly at a consistent height along the variable vane, the height being equivalent to the location along wingspan. In some embodiments the radial setting pin 72 is elongate and in some embodiments, it has a substantially circular cross-section. The purpose of radial setting pin will be explained in more detail below.

The baseplate 60 of the gauge assembly 52 also has one or more TE/LE contact pins 74 which to ensure alignment of the gauge assembly at a fixed angle relative to the vane spindle axis of the variable vane. The one or more TE/LE contact pins are located on the first surface 63 of the baseplate. In some embodiments, including the embodiment shown in FIGS. 4 to 7, the baseplate 60 has a pair of TE/LE contact pins 74, one TE/LE contact pin is located on the first surface 63 of the baseplate adjacent the first side 65 of the baseplate, and the other TE/LE contact pin is located on the first surface 63 of the baseplate adjacent the second side 66 of the baseplate. The TE/LE contact pins can be provided with TE/LE contact pin cushions to minimise any scratching or other damage to the variable vane but this is typically not necessary as it is the leading edge or the trailing edge of the variable vane that contacts the TE/LE contact pins rather than the pressure side or the suction side of the variable vane, which are more prone to being scratched.

The gauge assembly 52 has a clamp arm 80 that is pivotally attached to the baseplate 60. The clamp arm 80 has a first end 81, a second end 82, a first surface 83, a second surface 84, a first side 85 and a second side 86. The clamp arm 80 can be composed of any substance suitable for the purpose. In certain embodiments the clamp arm is composed or a metal or metal alloy, for example a rigid plastic material, or a composite material, e.g. carbon fibre.

In some embodiments the baseplate 60 and the clamp arm 80 are composed of the same substance. In some embodiments the baseplate and the clamp arm are composed of different substances.

The baseplate 60 and the clamp arm 80 form jaws for the gauge assembly 52 to support and retain a variable vane for its position to be accurately determined by the compressor variable angle measurement system 50.

The clamp arm 80 has at least one vane contact portion 88, i.e. a portion that extends from the first surface 83 of the clamp 80 that is configured and positioned to contact a variable vane to be measured in the compressor variable angle measurement system whilst minimising any scratching or other damage to the variable vane. In some embodiments, as shown in FIGS. 4 to 7, the vane contact portion 88 includes a vane contact cushion 89, which e.g. may be hemispherical in shape and which e.g. may be composed of a scratch-resistant plastic/polymer material.

The number of vane contact portions 88 that are provided on the clamp can vary as required. In some embodiments a single vane contact portion 88 is provided on the clamp as this usefully balances the provision of effective support for the variable vane with the desire to minimise the possibility of the variable vane being scratched or otherwise damaged.

The clamp arm 80 can be pivotally attached to the baseplate 60 in a variety of ways. In some embodiments, including the embodiment shown in FIGS. 4 to 7, the claim arm 80 has a pair of pivot portions 90, one extending from the first side 85 of the clamp arm and another extending from the second side 86 of the clamp arm. The pivot portions 90 are formed to be received within pivot supports that are formed in the baseplate 60 of the gauge assembly 52. These pivot supports are not shown in FIGS. 4 to 7.

The first end 81 of the clamp arm 80 is spring urged towards the first section 61 of the baseplate 60 by a spring 92 that is located between the first surface 63 of the baseplate and the first surface 83 of the clamp arm at a location between the point of pivotal attachment and the second section 62 of the baseplate and the second section 82 of the clamp arm. The spring 92 serves to removably grip a variable vane 44 of a gas turbine engine 10 between the clamp arm 80 of the gauge assembly 52 and the baseplate 60 of the gauge assembly 52, more particularly between the vane contact cushion 89 of the clamp arm 80 of the gauge assembly 52 and the vane contact cushions 69 of the baseplate 60 of the gauge assembly 52. For illustrative purposes, a compression spring is shown but other spring configurations are possible including rotary, extension springs, torsion bars or pneumatic/hydraulic piston type devices.

In use a variable vane 44 whose position is to be determined by the compressor variable angle measurement system is placed within the jaws of the gauge assembly 52 formed by the first section 61 of the baseplate 60 and the first section 81 of the clamp arm 80. The variable vane 44 is held in place in the gauge assembly 52 between vane contact cushions 69 of the baseplate 60, the TE/LE contact pin(s) 74 of the baseplate, and the vane contact cushions 89 of the clamp arm 80.

In certain embodiments, including the one shown in FIGS. 4 to 7, the gauge assembly includes seven points of contact to a variable vane (not shown): three vane contact cushions 69 on the first surface 63 of the baseplate 60 contact the underside of the variable vane, a single vane contact cushion 89 on the first surface 83 of the clamp arm 80 contacts the upper side of the variable vane, two TE/LE contact pins 74 to contact the leading edge or the trailing edge of the variable vane, and a final steel leg in contact with the inner penny (not shown).

Figure 8:
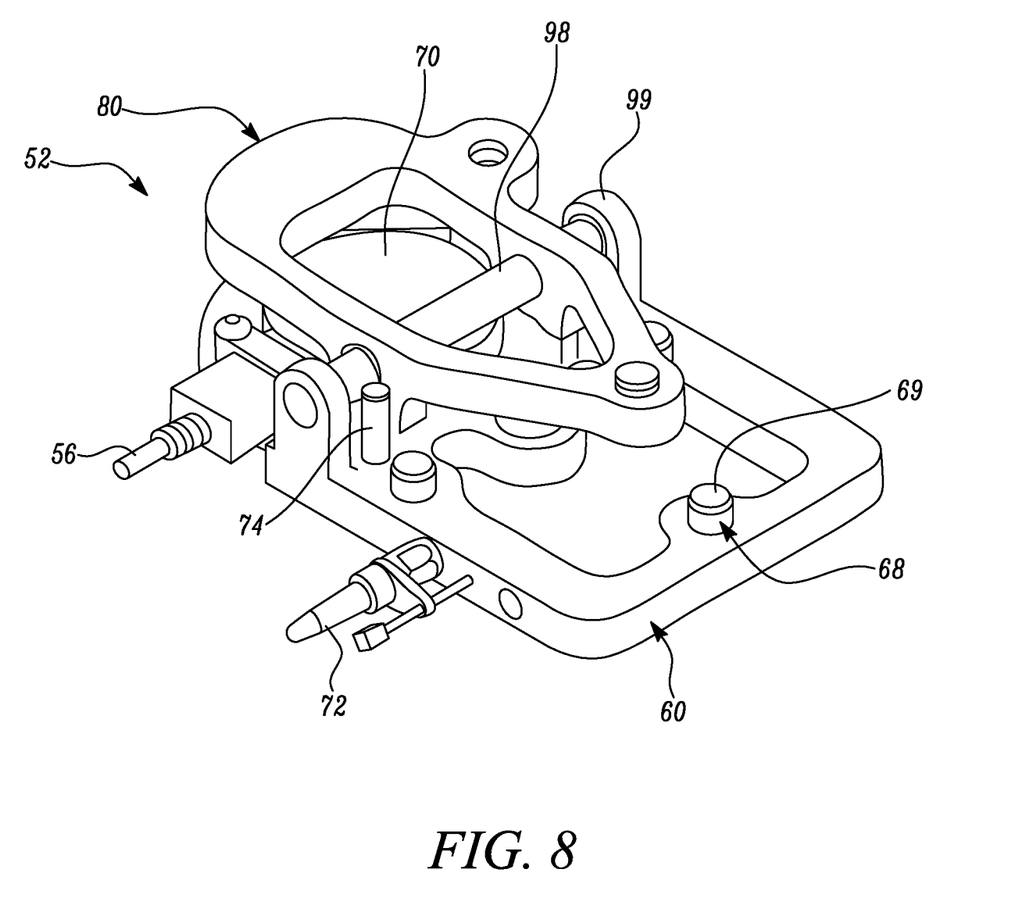
FIG. 8 shows an alternative embodiment of a gauge assembly of the compressor variable angle measurement system of the present disclosure.

FIG. 8 shows a second embodiment of a gauge assembly 52 of the compressor variable angle measurement system 50 of the present disclosure. It includes most of the features of the first embodiment of the gauge assembly, one notable difference being the baseplate and the clamp include apertures 94 and 96 respectively. The provision of these apertures assists the user to see whilst using the equipment better. It also enables the gauge assembly to be lighter in weight. The figure also shows a pivot pin 99 about which the baseplate 60 pivots with respect to the clamp arm 80. The pivot pin 99 is held with pivot supports 99 that are formed in the baseplate 60.

Figure 9:
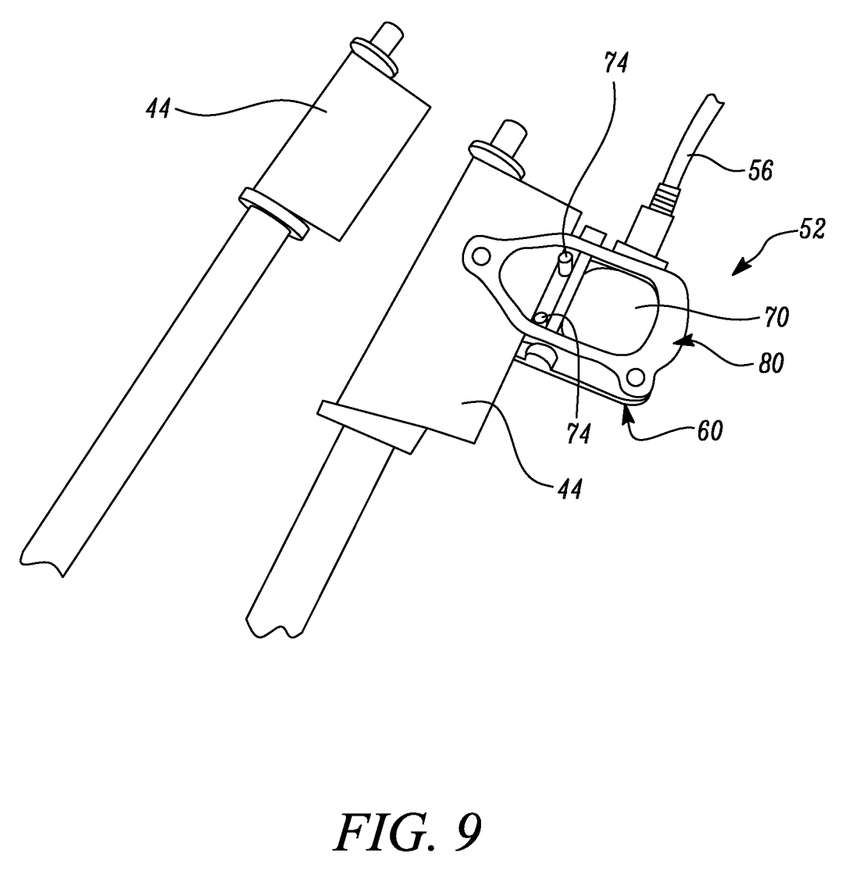
FIG. 9 shows two gas turbine engine variable vanes, one of which being held within the gauge assembly shown in FIG. 8.

FIG. 9 shows two gas turbine engine variable vanes, one of which being held within the second embodiment of a gauge assembly of the compressor variable angle measurement system of the present disclosure. This alternative embodiment is fundamentally identical to the embodiment represented schematically in FIGS. 4 to 7. The gauge assembly is shown viewed with the clamp arm 80 in the foreground. In this alternative embodiment the clamp arm 80 has an aperture through which the inertial measurement unit 70 is visible.

Figure 10:
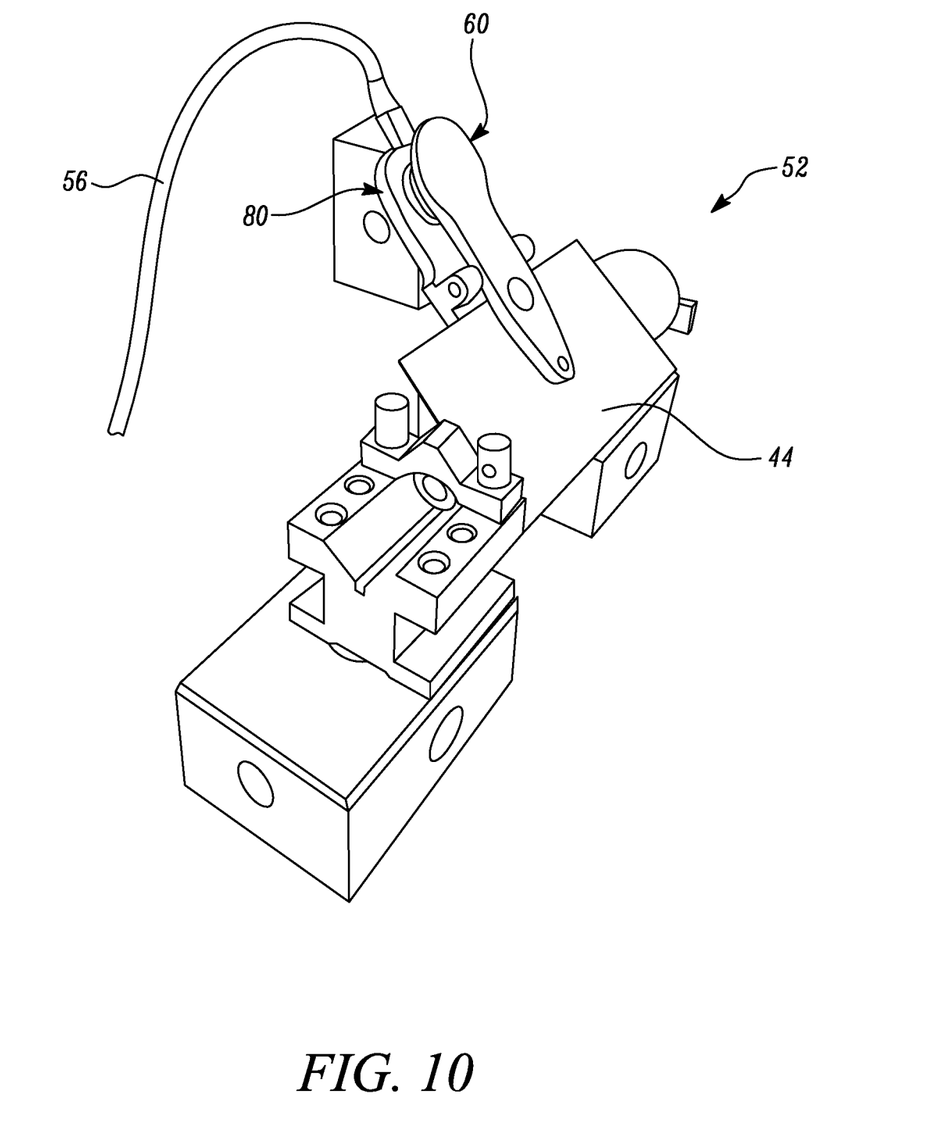
FIG. 10 shows a gas turbine engine variable vane gripped by the gauge assembly shown in FIGS. 8 and 9 viewed from a different angle.

FIG. 10 shows a gas turbine engine variable vane gripped by the alternative embodiment of the gauge assembly of the compressor variable angle measurement system of the present disclosure shown in FIG. 9 but viewed from a different angle i.e. the baseplate 60 is in the foreground.

In certain embodiments the compressor variable angle measurement system includes a set of gauge assemblies, each being sized and configured for the variable vanes of a particular gas turbine engine. The set may, for example, consist of three gauge assemblies i.e. a large, an intermediate and a small gauge assembly.

In certain embodiments each gauge assembly in a set of gauge assemblies may differ only in size. In certain embodiments one or more of the gauge assemblies in a set of gauge assemblies may differ in construction.

In any case the gauge assembly 52, or more particularly the inertial measurement unit 70 of the gauge assembly, is configured to make certain measurements that are communicated to the computing device 54 for analysis and display.

In some embodiments, such as that shown in FIG. 4, the inertial measurement unit 70 is hard-wired to the computing device 54 by a detachable cable 56, for example a conventional USB cable. In other embodiments the computing device is wirelessly connectable to the inertial measurement unit 70 via a suitable wireless technology, for example by Bluetooth® short-range wireless technology.

The computing device can be any device that can collect and analyse signals from the sensor module. In some embodiments the computing device is a tablet computer. The computing device is loaded with suitable software, for example a software application and a configuration file. This configuration file contains calibration parameters specific to the gauge assembly which is read by the application software upon initialisation. As the compressor variable angle measurement system is typically constructed to be portable within a maintenance location, the computing device is ideally constructed or protected to reasonably withstand such use.

In some embodiments the compressor variable angle measurement system comprises a kit that includes a set of gauge assemblies, a sensor module, and a computing device. The kit is supplied in a suitable case.

The compressor variable angle measurement system of the present disclosure is useful for measuring Variable Stator Vane (VSV) and Variable Inlet Guide Vane (VIGV) stagger angles in gas turbine engine compressors. It can, for example generate, accurate (e.g. +/−0.2 degrees) aerodynamic stagger angles for compressor blading.

The judicious positioning of variable vanes in a gas turbine engine compressor can improve compressor aerodynamics and therefore compressor efficiency and engine fuel efficiency.

High pressure ratio axial compressors require variable geometry (angle) vanes in the front stages to unload the blades aerodynamically at low power to avoid compressor stall/surge. The vanes open gradually as the power and speed of the compressor rise and critically affect both surge margin and efficiency of the machine. Knowing the angle/positioning of variable vanes is important to understanding and controlling compressor and engine performance.

The compressor variable angle measurement system facilitates data of sufficient fidelity to allow engine design to be modified to realise fuel burn and noise benefits. The application of data at the level of fidelity afforded by the system makes the system particularly useful. That is because, the current understanding of variable vane angles relies on a statistical approach to allow for tolerance stack ups between the outside of the engine where the actuation system is typically located and the vane aerodynamic surfaces. There are many line items and the resultant uncertainty can be high. However by measuring the actual aerodynamic surface orientations this can be significantly reduced. With the benefit of such data, the aerodynamic design of the compressor can be improved because of the higher confidence that design intent will be met in reality i.e.

less margin required. This extends to transient performance as well as steady state, transient performance being important during, for e.g., engine acceleration scenarios such as go-around scenarios at approach in cases of rejected landings. Such can now be faster which is safer, or trade for noise because the aircraft can be now on a steeper approach glide path and thus generally further from the ground during approach.

A method of positioning variable vanes in a compressor of a gas turbine engine will now be described that involves employing the compressor variable angle measurement system of the present disclosure.

The method involves removably gripping a variable vane 44 of a compressor of a gas turbine engine within a gauge assembly 52 of the compressor variable angle measurement system In the first step, step (a) of the method, a variable vane of the compressor is removably gripped within a gauge assembly 52 of the compressor variable angle measurement system 50 of the present disclosure.

In step (a) the between the variable vane 44 is located on the leading edge vane engaging portion 74*a* and trailing edge vane engaging portion 74*b* of the baseplate and gripped between the vane contact portions 68 of the baseplate and the vane contact portion 88 of the clamp arm.

In the second step, step (b) of the method, the radial setting pin 72 is brought into contact with the penny that supports the variable vane. As explained above, the radial setting pin is used to set the gauge assembly at a consistent height along the variable vane.

In the third step, step (c) of the method, the position of the variable vane is measured with respect to the radial setting pin.

For example, the software captures the output of the inertial measurement unit (IMU) when the user is satisfied the gauge is fitted correctly to the variable vane and initiates the recording process via the computing device (e.g. an industrial tablet computer) that contains the software, calibrations and user interface. The software proses the raw digital data into a vane angle that is to a consistent definition as the design mechanical drawings and aerodynamic design intent. The data may be stored on the tablet for each variable vane of a variable vane stage set for later retrieval and analysis.

Measurements made by the inertial measurement unit 70 of the gauge assembly are communicated to the computing device 54 for analysis and display.

In the fourth step, step (c) of the method, the position of the variable vane is adjusted to a desired position.

The compressor variable angle measurement system provides information to the user. It is at the user's discretion to adjust the vane set position based on the data provided. In other words the compressor variable angle measurement system provides technical information that enables informed decision making.

It will be understood that the invention is not limited to the embodiments above-described and various modifications and improvements can be made without departing from the concepts described herein.

The invention claimed is:

1. A compressor variable angle measurement system for guiding the positioning of a variable vane supported on a penny of a compressor of a gas turbine engine, the compressor variable angle measurement system comprising
a gauge assembly that is connectable to a computing device;
the gauge assembly comprises:
a baseplate that has a first section and a second section, the first section having a plurality of edge contact pins, a plurality of vane contact portions, and a radial setting pin, the second section having an inertial measurement unit, the radial setting pin being configured to contact the penny that supports the variable vane; and
a clamp arm that is pivotally attached to the baseplate and has a first section that has a vane contact portion, the first section of the clamp arm being spring urged towards the first section of the baseplate;
the gauge assembly being configured to removably grip the variable vane between the plurality of vane contact portions of the baseplate and the vane contact portion of the clamp arm and on the plurality of edge contact pins of the baseplate, a stagger angle of the variable vane with respect to the radial setting pin being determined by the computing device from measurements made by the inertial measurement unit.

2. The compressor variable angle measurement system of claim 1, wherein the plurality of edge contact pins are located adjacent to where the baseplate is pivotally attached to the clamp arm.

3. The compressor variable angle measurement system of claim 2, wherein the plurality of edge contact pins are located adjacent to pivot portions formed in the clamp arm about which the baseplate is pivotally attached to the clamp arm.

4. The compressor variable angle measurement system of claim 2, wherein the plurality of edge contact pins are located adjacent to pivot supports formed in the baseplate about which the clamp arm is pivotally attached to the baseplate.

5. The compressor variable angle measurement system claim 1, wherein the plurality of vane contact portions of the baseplate includes three vane contact portions.

6. The compressor variable angle measurement system of claim 1, wherein the plurality of vane contact portions of the baseplate have vane contact cushions.

7. The compressor variable angle measurement system of claim 6, wherein the vane contact cushions are formed of nylon.

8. The compressor variable angle measurement system of claim 1, wherein the vane contact portion of the clamp arm has a vane contact cushion.

9. The compressor variable angle measurement system of claim 8, wherein the vane contact cushion is formed of nylon.

10. The compressor variable angle measurement system of claim 1, wherein the baseplate includes an aperture.

11. The compressor variable angle measurement system of claim 1, wherein the clamp arm includes an aperture.

12. The compressor variable angle measurement system of claim 1, wherein the radial setting pin is elongate.

13. The compressor variable angle measurement system of claim 1, wherein the radial setting pin has a circular cross-section.

14. The compressor variable angle measurement system of claim 1, where the compressor variable angle measurement system comprises a set of guide assemblies configured to measure the positioning of different variable vanes in the gas turbine engine.

15. A method of positioning a variable vane in a compressor of a gas turbine engine, the method comprising the steps of:
removably gripping the variable vane of the compressor within a gauge assembly of the compressor variable angle measurement system according to claim 1;

bringing the radial setting pin into contact with the penny that supports the variable vane;

measuring the position of the variable vane with respect to the radial setting pin; and adjusting the position of the variable vane to a desired position informed by data obtained from the compressor variable angle measurement system.

16. The method of claim 15, wherein in the removably gripping step, the variable vane is located on the plurality of edge contact pins of the baseplate and gripped between the plurality of vane contact portions of the baseplate and the vane contact portion of the clamp arm.

* * * * *